US008296748B2

(12) United States Patent
Cheng et al.

(10) Patent No.: US 8,296,748 B2
(45) Date of Patent: Oct. 23, 2012

(54) METHOD AND SYSTEM FOR INTERMEDIATE REPRESENTATION OF SOURCE CODE

(75) Inventors: Buqi Cheng, Beijing (CN); Tin-Fook Ngai, San Jose, CA (US); Zhaohui Du, Shanghai (CN); PeiNan Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1125 days.

(21) Appl. No.: 12/178,842

(22) Filed: Jul. 24, 2008

(65) Prior Publication Data

US 2010/0023931 A1 Jan. 28, 2010

(51) Int. Cl.
*G06F 9/45* (2006.01)

(52) U.S. Cl. .................... 717/156; 717/146; 717/154
(58) Field of Classification Search ............... None
See application file for complete search history.

(56) References Cited

U.S. PATENT DOCUMENTS

| | | | | |
|---|---|---|---|---|
| 5,293,631 A | * | 3/1994 | Rau et al. | 717/154 |
| 5,327,561 A | * | 7/1994 | Choi et al. | 717/157 |
| 5,448,737 A | * | 9/1995 | Burke et al. | 717/146 |
| 5,475,842 A | * | 12/1995 | Gilbert et al. | 717/160 |
| 5,659,754 A | * | 8/1997 | Grove et al. | 717/158 |
| 5,768,596 A | * | 6/1998 | Chow et al. | 717/154 |
| 5,937,195 A | * | 8/1999 | Ju et al. | 717/156 |
| 6,014,518 A | * | 1/2000 | Steensgaard | 717/154 |
| 6,026,241 A | * | 2/2000 | Chow et al. | 717/152 |
| 6,035,124 A | * | 3/2000 | Ng | 717/146 |
| 6,064,820 A | * | 5/2000 | Subrahmanyam | 717/160 |
| 6,128,775 A | * | 10/2000 | Chow et al. | 717/156 |
| 6,151,706 A | * | 11/2000 | Lo et al. | 717/155 |
| 6,182,284 B1 | * | 1/2001 | Sreedhar et al. | 717/146 |
| 6,223,341 B1 | * | 4/2001 | Bittner et al. | 717/154 |
| 6,249,910 B1 | * | 6/2001 | Ju et al. | 717/146 |
| 6,260,190 B1 | * | 7/2001 | Ju | 717/156 |
| 6,286,135 B1 | * | 9/2001 | Santhanam | 717/146 |
| 6,505,345 B1 | * | 1/2003 | Chen et al. | 717/154 |
| 6,564,372 B1 | * | 5/2003 | Babaian et al. | 717/151 |
| 6,571,387 B1 | * | 5/2003 | Chow et al. | 717/156 |
| 6,625,808 B1 | * | 9/2003 | Tarditi | 717/154 |
| 6,651,247 B1 | * | 11/2003 | Srinivasan | 717/161 |

(Continued)

OTHER PUBLICATIONS

Peng Tu et al., "Gated SSA-Based Demand-Driven Symbolic Analysis for Parallelizing Compilers", ACM, 1995 <http://delivery.acm.org/10.1145/230000/224648/p414-tu.pdf>, pp. 1-10.*

(Continued)

*Primary Examiner* — Thuy Dao
*Assistant Examiner* — Samuel Hayim
(74) *Attorney, Agent, or Firm* — Schwabe, Williamson & Wyatt, P.C.

(57) ABSTRACT

A method to provide effective control and data flow information in an Intermediate Representation (IR) form. A Path Sensitive single Assignment (PSA) IR form with effective and explicit control and data path information supports control flow sensitive optimizations such as path sensitive symbolic substitution, array privatization and speculative multi threading. In the definition of PSA form, besides defining new versioned variables, the gamma functions keep control path information. The gamma function in PSA form keeps the basic attribute of SSA IR form and only one definition exists for each use. Therefore, all existing Single Static Assignment (SSA) IR form based analysis can be applied in PSA form. The gamma function in PSA form keeps all essential control flow information and eliminates unnecessary predicates at the same time.

28 Claims, 15 Drawing Sheets

U.S. PATENT DOCUMENTS

| | | | |
|---|---|---|---|
| 6,751,792 B1* | 6/2004 | Nair | 717/161 |
| 6,996,806 B2* | 2/2006 | Bates et al. | 717/125 |
| 7,058,561 B1* | 6/2006 | Kumar | 703/22 |
| 7,111,283 B2* | 9/2006 | Fraser et al. | 717/136 |
| 7,140,006 B2* | 11/2006 | Harrison et al. | 717/152 |
| 7,185,327 B2* | 2/2007 | Scales | 717/155 |
| 7,257,806 B1* | 8/2007 | Chen et al. | 717/141 |
| 7,353,503 B2* | 4/2008 | Nair et al. | 717/151 |
| 7,398,520 B2* | 7/2008 | Grover et al. | 717/144 |
| 7,493,610 B1* | 2/2009 | Onodera et al. | 717/155 |
| 7,530,107 B1* | 5/2009 | Ono et al. | 726/25 |
| 7,574,703 B2* | 8/2009 | Chen | 717/152 |
| 7,779,399 B2* | 8/2010 | Huang et al. | 717/154 |
| 2002/0092005 A1* | 7/2002 | Scales | 717/162 |
| 2003/0106040 A1* | 6/2003 | Rubin et al. | 717/106 |
| 2004/0128660 A1* | 7/2004 | Nair et al. | 717/156 |
| 2004/0268331 A1* | 12/2004 | Mitchell et al. | 717/146 |
| 2008/0222206 A1* | 9/2008 | Chandra et al. | 707/104.1 |
| 2009/0125894 A1* | 5/2009 | Nair et al. | 717/156 |
| 2011/0099541 A1* | 4/2011 | Blomstedt et al. | 717/136 |

OTHER PUBLICATIONS

Arthur Stoutchinin et al., "Efficient Static Single Assignment Form for Predication", IEEE, 2001, <http://ieeexplore.ieee.org/stamp/stamp.jsp?tp=&arnumber=991116>, pp. 172-181.*

Manuel Arenaz et al., "A GSA-Based Compiler Infrastructure to Extract Parallelism from Complex Loops", ACM, 2003, <http://delivery.acm.org/10.1145/790000/782842/p193-arenaz.pdf>, pp. 1-12.*

Bowen Alpern, et al., "Detecting Equality of Variables in Programs", Proceedings of the Fifteenth Annual ACM SIGACT-SIGPLAN Symposium on Principles of Programming Languages, San Diego, California, Jan. 1988, pp. 1-11.

Robert A. Ballance, et al., "The Program Dependence Web: A Representation Supporting Control-, Data-, and Demand-Driven Interpretation of Imperative Languages", Proceedings of the ACM SIGPLAN'90 Conference on Programming Language Design and Implementation, White Plains, NY, Jun. 20-22, 1990, pp. 1-15.

Peng Tu, et al., "Efficient Building and Placing of Gating Functions", SIGPLAN Conference on Programming Language Design and Implementation, 1995, pp. 1-14.

Peng Tu, et al., "Gated SSA-Based Demand-Driven Symbolic Analysis for Parallelizing Compilers", ACM International Conference on Supercomputing, 1995, pp. 1-10.

Manuel Arenaz, et al., "A GSA-Based Compiler Infrastructure to Extract Parallelism from Complex Loops", Computer Architecture Group, Department of Electronics and Systems, San Francisco, CA, Jun. 2003, pp. 1-12.

* cited by examiner

```
X = 0;                            // Line 1
I = 0;                            // Line 2
Label1:                           // Line 3
if (I < 29) {                     // Line 4
    if (I > 50) {                 // Line 5
        goto Label3;              // Line 6
    } else {                      // Line 7
        goto Label2;              // Line 8
    }                             // Line 9
} else {                          // Line 10
    X = 1;                        // Line 11
}                                 // Line 12
Label2:                           // Line 13
Y = X;                            // Line 14
if (I %20 == 0) {                 // Line 15
    goto Label3;                  // Line 16
} else {                          // Line 17
    goto Label4;                  // Line 18
}                                 // Line 19
Label3:                           // Line 20
Z = X;                            // Line 21
I++;                              // Line 22
goto Label1;                      // Line 23
Label4:                           // Line 24
```

(PRIOR ART)
FIG. 1

```
X0 = 0;                           // D0  // Line 1
I0 = 0;                                   // Line 2
Label1:                                   // Line 3
X1= Φ (X4, X0);                   // D1   // Line 4
I1 = Φ (I2, I0);                          // Line 5
if (I1 < 29) {                            // Line 6
    if (I1 > 50) {                // // P // Line 7
        goto Label3;              // // Q // Line 8
    } else {                              // Line 9
        goto Label2;                      // Line 10
    }                                     // Line 11
} else {                                  // Line 12
    X2 = 1;                       // D2   // Line 13
}                                         // Line 14
Label2:                                   // Line 15
X3 = Φ (X1, X2);                  // D3   // Line 16
Y = X3;                                   // Line 17
if (I1 % 20 == 0) {               // // S // Line 18
    goto Label3;                          // Line 19
} else {                                  // Line 20
    goto Label4;                          // Line 21
}                                         // Line 22
Label3:                                   // Line 23
X4 = Φ (X1, X3);                  // D4   // Line 24
Z = X4;                                   // Line 25
I2 = I1 + 1;                              // Line 26
goto Label1;                              // Line 27
Label4:                                   // Line 28
```

Block A, Block B, Block C, Block D, Block E, Block F (PRIOR ART)
FIG. 2

400

500

```
Iterate () {
    Let [u1, u2...un] be a topological order of CFG; Let D(u) be the versioned variables defined in u;
    c = true;
    While c is true {
        c = false;
        for i = 1 to n {
            If ui has multi predecessors {
                Let [p_f1, p_f2, ...p_fs] be γ functions propagated from predecessor nodes.
                Prg_f(ui) = Function_merge(ui, p_f1, p_f2, ...p_fs);
                If D(ui) != Ø AND D(ui) is defined by Φ {
                    If (NOT Equal(Gamma_f(ui), Prg_f(ui)) {
                        c = true;
                        Gamma_f(ui) = Prg_f(ui);
                    }
                }
            } else {
                Prg_f(ui) = Prg_f(p);
            }
            If ui has successors {s1, s2, ..sm} {
                for k = 0 to m {
                    p_f = Prg_f(ui);
                    Let [f1, f2...fs] be the γ functions with versioned variables in p_f.
                    for j = 0 to s {
                        Let [arg(fj, l0), arg(fj, l1)...arg(fj, lw)] be arguments of fj
                        for r = 0 to w {
                            if arg(fj, lr) is versioned variable v {
                                if ui has multi successors {
                                    f = create_gamma_function (m);
                                    condition(f) = ui;
                                    If D(ui) != Ø AND D(ui) is not defined by Φ
                                        arg(f, lr) = D(ui);
                                    else
                                        arg(f, lr) = v;
                                    arg(fj, lr) = f;
                                } else {
                                    If D(ui) != Ø AND D(ui) is not defined by Φ
                                        arg(fj, lr) = f;
                                }
                            }
                        }
                    }
                    Prg_f(sk) += p_f;
                }
                c = true;
            }
        }
    }
}
```

FIG. 6A

```
Function_merges(u,f₁, f₂...fs) {
        f₀ = ∅
        if ( u is loop header) {
                Assert(s == 2);
                Let f₀ be γ function propagated from outside of loop where o>=1 and o <=s;
                Let fb be γ function propagated from backedge of loop where b>=1, b<=s and
b != o;
                return create_Mu(f₀, fb);
        } else {;
                Let the condition and arguments of fi are fi(ci, ai1, ai2...aiw) where i = 1 to s;
                f = create_gamma_function (w);
                for i = 1 to s {
                        if (fi != f₀)
                                f = Couple_function_merge (u, f, fi);
                }
                return f;
        }
}

Couple_function_merge(u, f₁, f₂) {
        if (f₁ == ∅)
                return f₂ ;
        if (f₂ == ∅)
                return f₁;
        if (cond(f₁) == cond(f₂)) {
                Let the condition and arguments of fi are fi(ci, ai1, ai2...aiw) where i = 1 to 2;
                f = create_gamma_function(w);
                condition(f) = c₁;
                for i = 1 to w {
                        arg(f, i) = Couple_function_merge(u, a1i, a2i);
                }
                if arg(f, 0) is versioned none-Φ variable {
                        V = arg(f, 0);
                        for i = 2 to w {
                                if (NOT Equal(arg(f, i), V))
                                        return f;
                        }
                        return V;
                }
        } else {
                Assert(0);
        }
        return f;
}
```

FIG. 6B

```
D0 = 1;              // Line 1   } Block A
if (P) {             // Line 2   } Block B
  if (Q) {           // Line 3   }
    D2 = 3;          // Line 4   } Block D
    goto Label2;     // Line 5
  } else {           // Line 6
    goto Label1;     // Line 7
  }                  // Line 8
} else {             // Line 9
  D1 = 2;            // Line 10  }
  if (T) {           // Line 11  } Block C
    goto Label1;     // Line 12
  } else {           // Line 13
    goto Label4;     // Line 14
  }                  // Line 15
}                    // Line 16
Label1:              // Line 17
  D3 = Φ (D0, D1);   // Line 18  }
  X = D3;            // Line 19  } Block E
  if (S) {           // Line 20
    goto Label2;     // Line 21
  } else {           // Line 22
    goto Label3;     // Line 23
  }                  // Line 24
Label2:              // Line 25
  D4 = Φ (D2, D3);   // Line 26  } Block F
  Y = D4;            // Line 27
Label3:              // Line 28
  D5 = Φ (D4, D3);   // Line 29  } Block G
  Z = D5;            // Line 30
Label4:              // Line 31
```

Edge 1350: γ( P, D0, ∅)
Edge 1352: γ(P, ∅, D0)
Edge 1354: γ( P, γ(Q, D0, ∅), ∅)
Edge 1356: γ( P, γ(Q, ∅, D0), ∅)
Edge 1358: γ(P, ∅, γ(T, D1, ∅))
Edge 1362: γ( P, γ(Q, D2, ∅), ∅)

D3 = γ( P, γ(Q, ∅, D0), γ(T, D1, ∅))

Edge 1364: γ( P, γ(Q, ∅, γ(S, D0, ∅)), γ(T, γ(S, D1, ∅) ,∅))
Edge 1366: γ( P, γ(Q, ∅, γ(S, ∅, D0)), γ(T, γ(S, ∅, D1) ,∅))

D4 = γ( P, γ(Q, D2, ∅), ∅) + γ( P, γ(Q, ∅, γ(S,D0, ∅)), γ(T, γ(S,D1, ∅) ,∅)))
= γ( P, γ(Q, D2, ∅) +γ(Q, ∅, γ(S,D0, ∅)), γ(T, γ(S,D1, ∅) ,∅)))
= γ( P, γ(Q, D2, γ (S, D0, ∅)), γ(T, γ (S, D1, ∅)))

Edge 1368: γ( P, γ(Q, D2, γ (S, D0, ∅)), γ(T, γ (S, D1, ∅), ∅)))

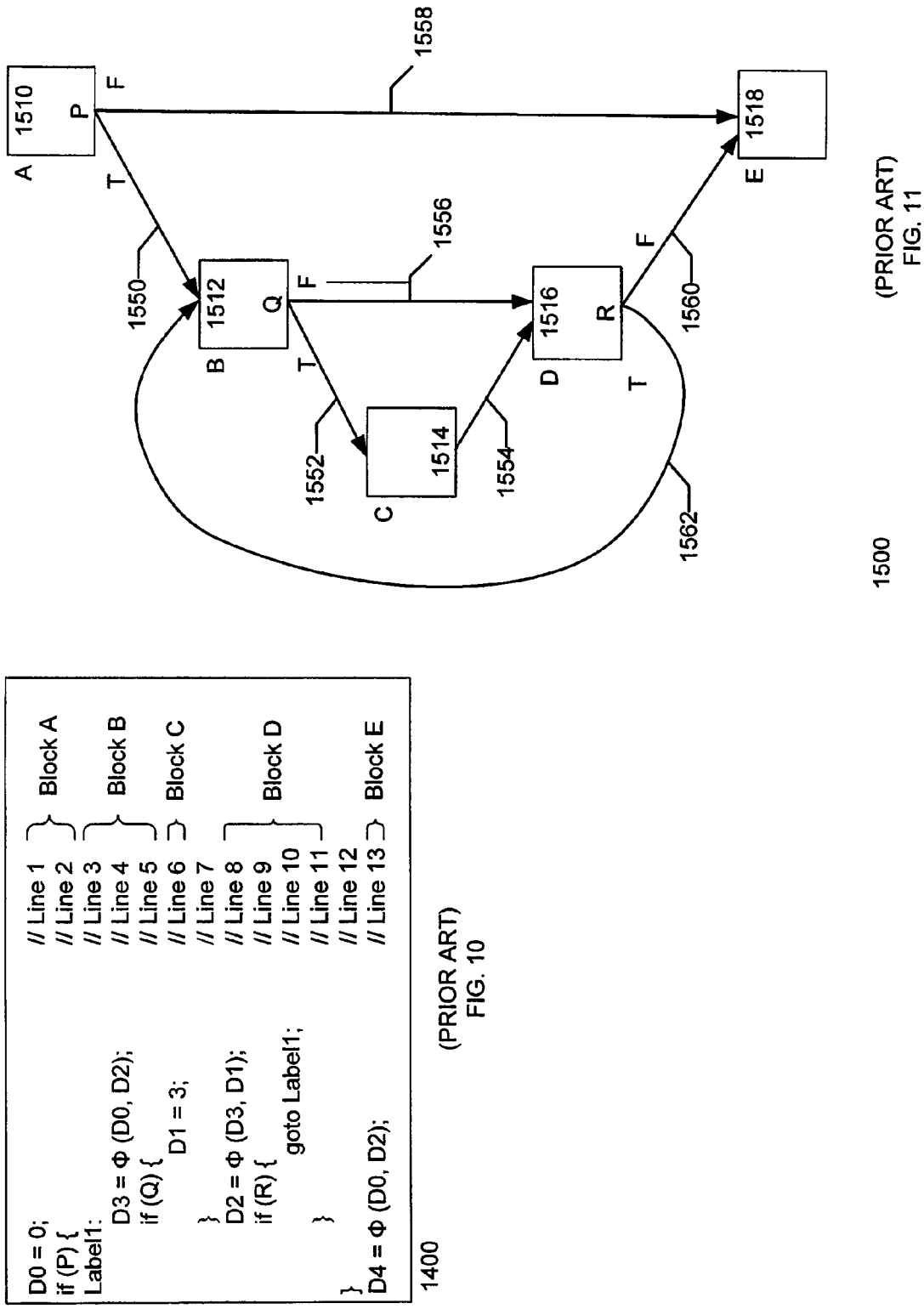

FIRST PASS

Edge 1550: γ(P, D0, ∅)

Edge 1558: γ(P, ∅, D0)

D3 = μ(γ(P, D0, ∅), ∅)

Edge 1552: γ(P, γ(Q, D3, ∅), ∅)

Edge 1556: γ(P, γ(Q, ∅, D3), ∅)

Edge 1554: γ(P, γ(Q, D1, ∅), ∅)

D2 = γ(P, γ(Q, ∅, D3), ∅) + γ(P, γ(Q, D1, ∅), ∅) = γ(P, γ(Q, D1, D3), ∅)

Edge 1562: γ(P, γ(Q, γ(R, D1, ∅), γ(R, D3, ∅)), ∅)

Edge 1560: γ(P, γ(Q, γ(R, ∅, D1), γ(R, ∅, D3)), ∅)

D4 = γ(P, γ(Q, γ(R, ∅, D1), γ(R, ∅, D3)), ∅) + γ(P, ∅, D3) = γ(P, γ(Q, γ(R, ∅, D1), γ(R, ∅, D3)), D3)

SECOND PASS

Edge 1550: γ(P, D0, ∅)

Edge 1558: γ(P, ∅, D0)

D3 = μ(γ(P, D0, ∅), γ(P, γ(Q, γ(R, D1, ∅), γ(R, D3, ∅)), ∅))

Edge 1552: γ(P, γ(Q, D3, ∅), ∅)

Edge 1556: γ(P, γ(Q, ∅, D3), ∅)

Edge 1554: γ(P, γ(Q, D1, ∅), ∅)

D2 = γ(P, γ(Q, ∅, D3), ∅) + γ(P, γ(Q, D1, ∅), ∅) = γ(P, γ(Q, D1, D3), ∅)

Edge 1562: γ(P, γ(Q, γ(R, D1, ∅), γ(R, D3, ∅)), ∅)

Edge 1560: γ(P, γ(Q, γ(R, ∅, D1), γ(R, ∅, D3)), ∅)

D4 = γ(P, γ(Q, γ(R, ∅, D1), γ(R, ∅, D3)), ∅) + γ(P, ∅, D0) = γ(P, γ(Q, γ(R, ∅, D1), γ(R, ∅, D3)), D0)

THIRD PASS

Edge 1550: γ(P, D0, ∅)

Edge 1558: γ(P, ∅, D0)

D3 = μ(γ(P, D0, ∅), γ(P, γ(Q, γ(R, D1, ∅), γ(R, D3, ∅)), ∅))

Edge 1552: γ(P, γ(Q, D3, ∅), ∅)

Edge 1556: γ(P, γ(Q, ∅, D3), ∅)

Edge 1554: γ(P, γ(Q, D1, ∅), ∅)

D2 = γ(P, γ(Q, ∅, D3), ∅) + γ(P, γ(Q, D1, ∅), ∅) = γ(P, γ(Q, D1, D3), ∅)

Edge 1562: γ(P, γ(Q, γ(R, D1, ∅), γ(R, D3, ∅)), ∅)

Edge 1560: γ(P, γ(Q, γ(R, ∅, D1), γ(R, ∅, D3)), ∅)

```
            D0 = 0;                          // Line 1   ⎫ Block A
Label1:                                      // Line 2   ⎫
        D1 = Φ (D0, D6);                     // Line 3   ⎬ Block B
        if (P) {                             // Line 4   ⎭
                if (Q) {                     // Line 5   ⎫
                        goto Label3;         // Line 6   ⎪
                } else {                     // Line 7   ⎬ Block C
                        goto Label2;         // Line 8   ⎪
                }                            // Line 9   ⎭
        } else {                             // Line 10
                D2 = 3;                      // Line 11  ⎬ Block D
        }                                    // Line 12
Label2:                                      // Line 13  ⎫ Block E
        D3 = Φ (D1, D2);                     // Line 14  ⎭
Label3:                                      // Line 15  ⎫
        D4 = Φ (D1, D3);                     // Line 16  ⎬ Block F
        If (R) {                             // Line 17  ⎭
                X = D4;                      // Line 18  ⎬ Block G
        } else {                             // Line 19
                D5 = 5;                      // Line 20  ⎬ Block H
        }                                    // Line 21
        D6 = Φ (D4, D5);                     // Line 22  ⎫
        If (S) {                             // Line 23  ⎪
                goto Label1;                 // Line 24  ⎬ Block I
        }                                    // Line 25  ⎭
```

1700

(PRIOR ART)

FIG. 13

METHOD AND SYSTEM FOR INTERMEDIATE REPRESENTATION OF SOURCE CODE

FIELD OF THE INVENTION

This invention relates to an intermediate representation form of source code, and more specifically but not exclusively, to an intermediate representation of source code that provides effective and explicit control and data flow information.

BACKGROUND DESCRIPTION

In compiler design, Intermediate Representation (IR) is important for analyzing and optimizing the data and control flow of source code. There are commonly known IR forms such as Static Single Assignment (SSA) that source code can be converted into. Source code include but are not limited to programming statements written in a computer language or any form of statements readable by a compiler or machine. FIG. 1 shows an example of source code 100.

In SSA IR form, every definition or assignment of a variable in the source code is represented as an assignment of a distinct instance (or version) of the variable. FIG. 2 shows an example of the SSA IR form 200 of the source code 100. Detailed explanation of the conversion of the source code 100 to SSA IR form 200 is not undertaken herein as it is apparent to one of ordinary skill in the relevant art.

In FIG. 2, the SSA IR form 200 is separated into six basic blocks A to F. A basic block is a basic unit of code sequence in the IR form that always executes sequentially without change in control flow from the first instruction of the block to the last instruction of the block whenever the first instruction is executed. The variable X in line 1 of FIG. 1 is defined by five new versions in FIG. 2, namely, X0 in line 1, X1 in line 4, X2 in line 13, X3 in line 16, and X4 in line 24 of the SSA IR form 200. The definitions of X0, X1, X2, X3 and X4 are denoted by D0, D1, D2, D3, and D4 respectively. The control flow condition predicates of the conditional branch statements in line 6, line 7 and line 18 of FIG. 2 are denoted as P, Q and S respectively.

FIG. 3 shows a Control Flow Graph (CFG) 300 of the SSA IR form 200. Nodes A 310, B 312, C 314, D 316, E 318, and F 320, represent the basic blocks A to F in FIG. 2. Detailed explanation of the creation of the CFG 300 from the SSA IR form 200 is not undertaken herein as it is apparent to one of ordinary skill in the relevant art how the CFG is created. Paths 350, 352, 354, 356, 358, 360, 362, 364, and 366 show the data and control flow of the SSA IR form 200.

SSA IR form, although it can make several optimizations such as constant propagation, copy propagation and symbolic analysis more effective, only provides control-flow-insensitive data flow information. This is observed in lines 4, 16 and 24 of the SSA IR form 200 where phi ($\phi$) functions introduce new versions of a variable to cover all possible versions reaching at the merge point of different control flow path. However, the phi ($\phi$) function does not contain any control flow information. It does not show which version of the variable comes from a particular control flow path. In SSA IR form 200, the definitions of variable version X3 and X4 are given in D3 and D4 respectively as $$X3 = \phi(X1, X2) \text{ and } X4 = (X1, X3)$$

The phi ($\phi$) function in D3 shows that X3 is assigned from either X1 or X2 but it does not have control flow information on how X1 and X2 reach the D3.

Gated Single Assignment (GSA) and Thinned Gated Single Assignment (TGSA) are two prior proposed extensions to SSA IR form to provide additional control flow information. In GSA and TGSA forms, control flow condition predicates are integrated into the representation of SSA IR form. A gamma ($\gamma$) function is used instead of phi ($\phi$) function in SSA IR form 200 to represent merging of different versions of variable X. In TGSA form, D3 and D4 define X3 and X4 respectively as $$X3 = \gamma(P, X1, X2) \text{ and } X4 = \gamma(P, \gamma(Q, X1, X3), X3)$$

In GSA form, D3 and D4 define X3 and X4 respectively as $$X3 = \gamma(P, \gamma(Q, \emptyset, X1), X2) \text{ and } X4 = \gamma(P, \gamma(Q, X1, \gamma(S, X3, \emptyset)), \gamma(S, X3, \emptyset))$$

The difference between GSA and TGSA form is that GSA form provides more accurate control flow information by showing all control predicates required to reach the current definition. A null ($\emptyset$) in the gamma ($\gamma$) function of GSA form shows a control flow path that does not reach the current definition.

GSA and TGSA do not provide explicit accurate path information important in control flow sensitive analysis. For example, in GSA form, definition D4 cannot provide the path information from definition of X1 (D1) to definition of X4 (D4) directly. An indirect way is to expand the pseudo assignment expressions of D4's gamma ($\gamma$) function. The expanded expression is given as $$X4 = \gamma(P, \gamma(Q, X1, \gamma(S, \gamma(P, \gamma(Q, \emptyset, X1), X2), \emptyset)), \gamma(S, \gamma(P, \gamma(Q, \emptyset, X1), X2), \emptyset))$$

This expanded expression has unnecessary and redundant path predicates.

In TGSA form, since some control path information is dropped in the gamma ($\gamma$) function, it does not support accurate path sensitive analysis. For example, X1 can only reach D3 when the condition predicate Q is false but the gamma ($\gamma$) function in D3 in TGSA form does not provide any information regarding the condition predicate Q.

BRIEF DESCRIPTION OF THE DRAWINGS

The features and advantages of embodiments of the invention matter will become apparent from the following detailed description of the subject matter in which:

FIG. 1 illustrates a prior art source code example;
FIG. 2 illustrates a prior art SSA IR form example.

FIG. 6A illustrates a pseudo code of PSA IR form conversion in accordance with one embodiment of the invention;

FIG. 6B illustrates a pseudo code of PSA IR form conversion in accordance with one embodiment of the invention;

FIG. 7 illustrates a prior art SSA IR form example;

FIG. 8 illustrates PSA IR form in accordance with one embodiment of the invention;

FIG. 10 illustrates a prior art SSA IR form example;

FIG. 11 illustrates a prior art CFG of SSA IR form example;

FIG. 12 illustrates PSA IR form in accordance with one embodiment of the invention;

FIG. 13 illustrates a prior art SSA IR form example.

DETAILED DESCRIPTION

Figure 3:
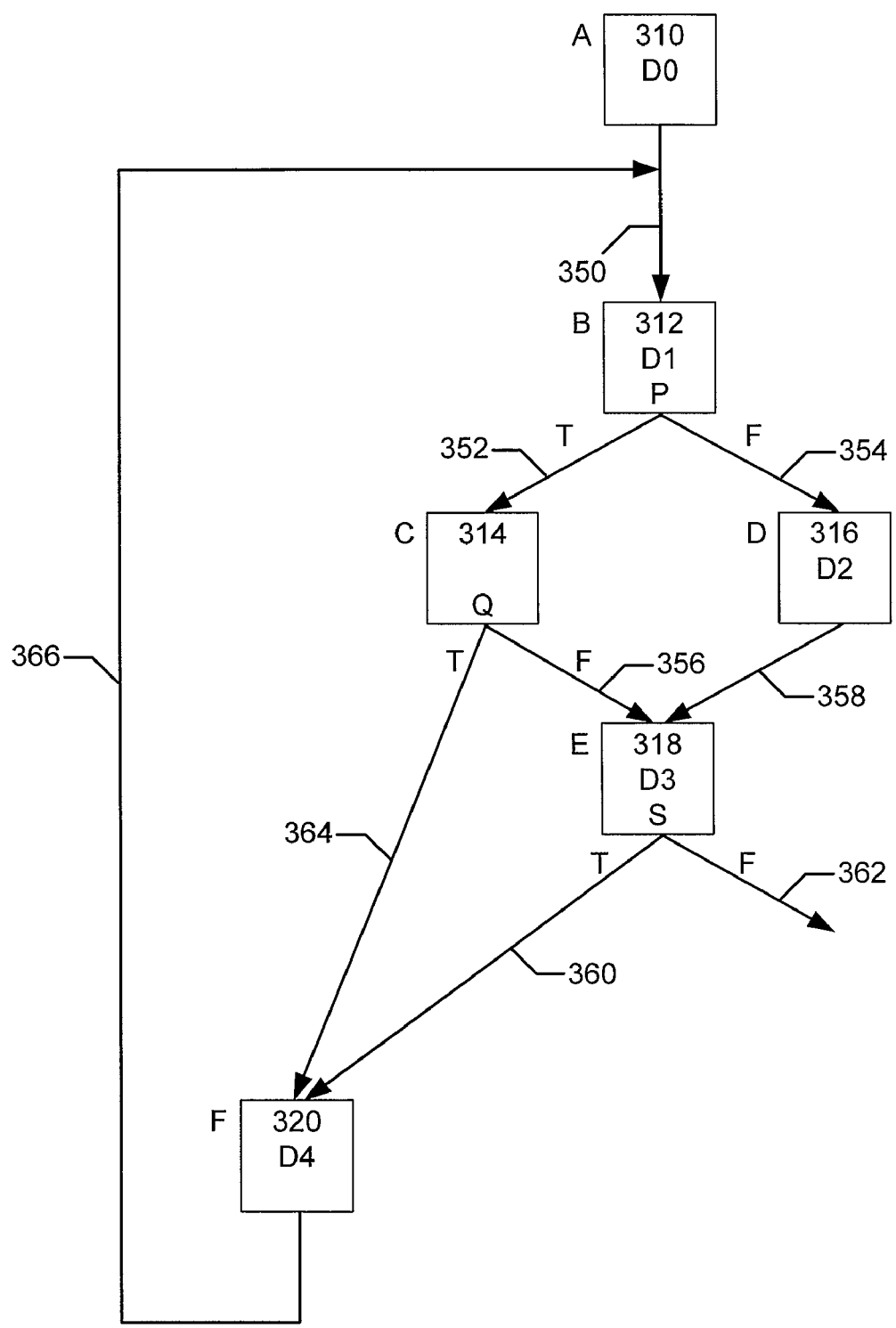
FIG. 3 illustrates a prior art CFG of SSA IR form example.

Reference in the specification to "one embodiment" or "an embodiment" of the invention means that a particular feature, structure or characteristic described in connection with the embodiment is included in at least one embodiment of the invention. Thus, the appearances of the phrase "in one embodiment" appearing in various places throughout the specification are not necessarily all referring to the same embodiment.

Embodiments of the invention provide a Path Sensitive single Assignment (PSA) IR form with effective and explicit control and data path information to support control flow sensitive optimizations such as path sensitive symbolic substitution, array privatization and speculative multi threading.

In one embodiment of the invention, the PSA form is defined based on an IR form including but is not limited to, an SSA IR form. In PSA form, a versioned variable defined by a phi ($\phi$) function in the base SSA IR form is termed as a $\phi$ variable. A versioned variable not defined by a phi ($\phi$) function is termed as a non-$\phi$ variable. For example in FIG. 2, versioned variables X1, X3, and X4 are termed as $\phi$ variables and variables X0 and X2 are termed as non-$\phi$ variables in PSA form.

One embodiment of PSA form is defined by three properties as described below. Other embodiments of PSA form may have more than three properties where the additional property (or properties) does not affect the operation of the invention described herein.

The first property of PSA form is as follows:
For a versioned variable $v_i$ of a variable v in a node x, the versioned variable v'$_i$s gamma function from a node z is recursively defined as $v_i = \gamma_z =$ $= \gamma(P, \gamma_{n1}, \gamma_{n2}, \ldots, \gamma_{nm})$ if node z is a branch node, or
$y_k$ if node z is not a branch node and there is a path from node z to node x containing a branch node, or
$v_r$ if node z is not a branch node and there is only one direct path from node z to node x, or
$\emptyset$ if there is no path from node z to node x
Where
P is the condition predicate of the branch statement in node z,
the arguments $\gamma_{n1}, \gamma_{n2}, \ldots,$ and $\gamma_{nm}$ are the versioned variable v'$_i$s gamma functions from the immediate successor nodes $n_1, n_2, \ldots,$ and $n_m$ of node z respectively,
$y_k$ is the versioned variable v'$_i$s gamma function from node k that is the first branch node along all paths from node z to node x, and
$v_r$ is the versioned variable of the variable v that is not defined by a gamma function and reaches node x along the direct path from node z to node x.

When node z is a branch node and all $\gamma_{ni}$, i=1, 2, ... m, are identical, the versioned variable v'$_i$s gamma function from node z is simplified as:

$v_i = \gamma_z = \gamma_{n1} (=\gamma_{n2}= \ldots =\gamma_{nm})$

For a versioned variable $v_i$ of a variable v in a node x, its gamma function refers to its gamma function from the entry node of the CFG.

The second property of PSA form is as follows:
In PSA form, for each versioned variable $v_i$ of variable v defined in node x with a phi ($\phi$) function in the base SSA IR form where node x is not a loop header, the corresponding phi ($\phi$) function is replaced by the gamma function of $v_i$.

The third property of PSA is as follows:
In PSA form, for each versioned variable $v_i$ of variable v defined in a loop header node x with a phi ($\phi$) function in the base SSA IR form, the corresponding phi ($\phi$) function is replaced by the following mu ($\mu$) function:

$v_i = \mu(v_{init}, v_{iter})$ where $v_{init}$ is the gamma function of the initial versioned variable of variable v entering the loop header from outside of the loop body, and $v_{iter}$ is the gamma function of versioned variables of variable v reaching the loop header from the back edges of the loop. In this case, the gamma function of $v_i$ equals to $v_i$ itself.

In the definition of PSA form, besides defining new versioned variables, the gamma functions keep control path information. The gamma function in PSA form keeps the basic attribute of SSA IR form and only one definition exists for each use. Therefore, all existing SSA IR form based analysis can be applied in PSA form. In addition, PSA form has an advantage over SSA, GSA or TGSA IR forms. The gamma function in PSA form keeps all essential control flow information and eliminates unnecessary predicates at the same time. For example, from all the out-going paths of a branch node in a CFG, if the same versioned variable reaches the same joined node, no gamma function is built using the condition predicate of the branch node. PSA form keeps only effective and explicit control and data flow information and detailed examples are described later.

One embodiment of PSA form breaks out the implicit rule in SSA, GSA and TGSA IR forms where versioned variables defined by phi ($\phi$) functions or gamma ($\gamma$) functions are the arguments of the other phi ($\phi$) functions or gamma ($\gamma$) functions. As these versioned variables are defined by pseudo assignment in the joined node, redundant path information may be introduced. For example, as described earlier, the path information from definition D1 to definition D4 in GSA form has many condition predicates appearing in the middle of the reaching paths and the expanded pseudo assignment expression of D4's gamma function is long and unwieldy. In PSA form, definition D4 is defined as $X4 = \gamma(P, \gamma(Q, X1, \gamma(S, X1, \emptyset)), \gamma(S, X2, \emptyset))$ In PSA form, no other versioned variables produced by the gamma functions which exist between the entry of the CFG and the joined node appear as the arguments of the gamma function in the joined node. Therefore, the path information is simplified and readily available as compared to GSA form.

Figure 4:
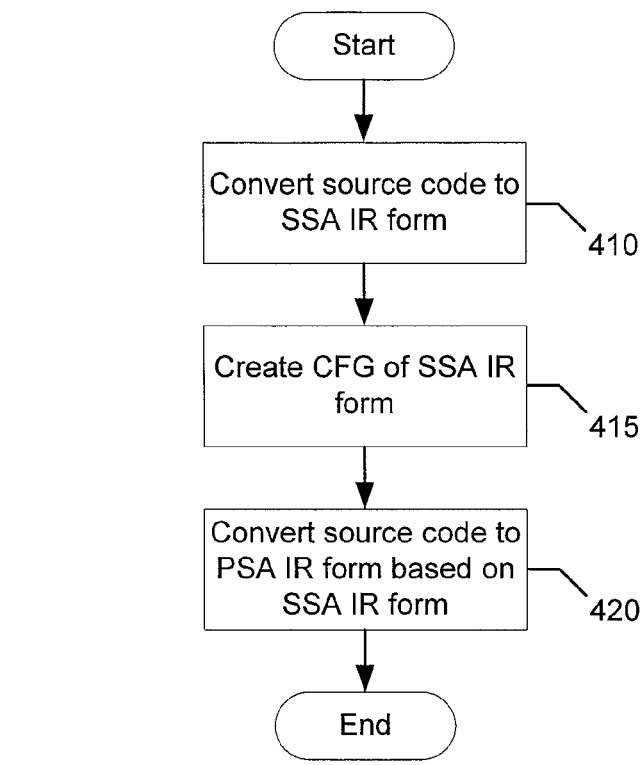
FIG. 4 is a flowchart illustrating the steps of PSA IR form conversion in accordance with one embodiment of the invention.

FIG. 4 illustrates a flowchart 400 of the steps to create PSA form of source code. Step 410 converts source code into SSA IR form with unique entry basic block. This step also converts any loop whose loop header has multiple loop pre-headers or multiple back edges into a loop that has single pre-header and single back edge. Step 415 creates the single-entry CFG of the SSA IR form in step 410. Based on the CFG created in step 415 and the SSA IR form in step 410, the source code is converted into PSA form in step 420. The detailed steps of the conversion to PSA form is described in other figures.

Figure 5A:
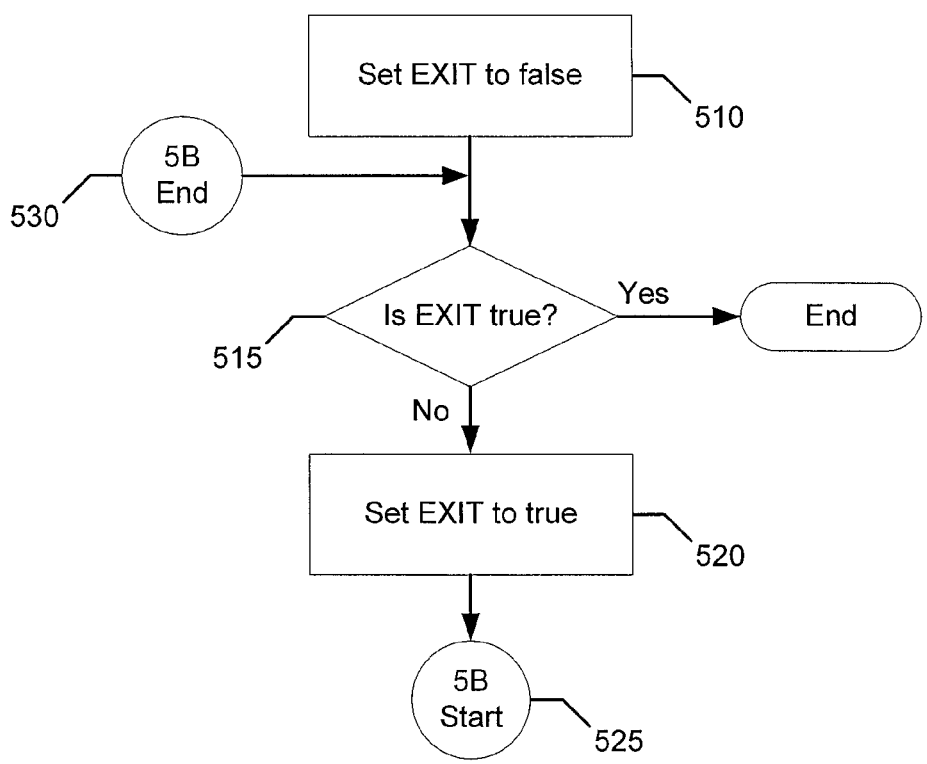
FIG. 5A is a flowchart illustrating the steps of PSA IR form conversion in accordance with one embodiment of the invention.

FIG. 5A illustrates a flowchart 500 of an iterative loop to perform the conversion of the source code into PSA form. In step 510, a Boolean variable EXIT is set to false as an initial condition of the loop. The Boolean variable EXIT is checked in step 515. If EXIT is true, the iteration terminates. If EXIT is false, the flow goes to step 525 where it begins the steps of flowchart in FIG. 5B. When the steps of flowchart 5B are completed, it goes to step 530 and step 530 goes to step 515 again to determine if EXIT is true.

Figure 5B:
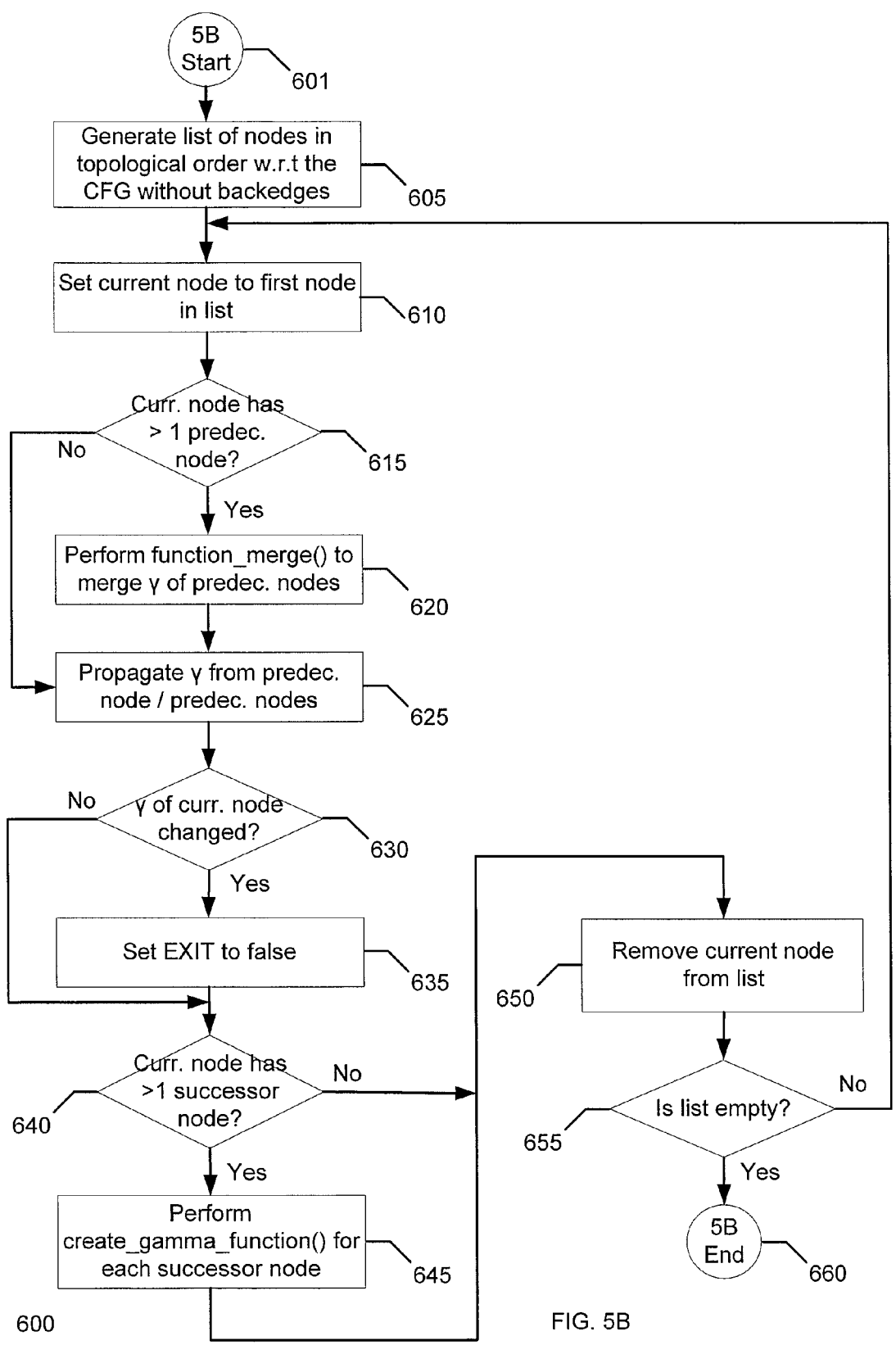
FIG. 5B is a flowchart illustrating the steps of PSA IR form conversion in accordance with one embodiment of the invention.

FIG. 5B illustrates a flowchart 600 of the detailed steps to perform the conversion of the PSA form of source code. Step 601 shows the link of the step 525 in FIG. 5A. Step 605 generates a list of nodes in topological order with respect to the CFG without back edges obtained in step 415. In one embodiment, obtaining the topological ordering includes but is not limited to, performing a depth-first search on the CFG and listing the nodes in reverse post ordering order. In step 610, the first node in the list obtained in step 605 is set as the current node. Step 615 determines if the current node has more than one predecessor node in the CFG. In one embodiment, the predecessor node is, but not limited to, the immediate node connected to the current node in the CFG.

If step 615 is true, the flow goes to step 620 where the gamma functions of the versioned variables in the predecessor nodes are merged. This is performed using function_merge( ) based on a set of merging rules to be described with reference to later figures. When the merged gamma function is obtained in step 620, the merged gamma function is propagated to all successor nodes of the current node in step 625. If step 615 is false, the flow goes to step 625 where the gamma function of the versioned variable in the predecessor node is propagated to all successor nodes of the current node without performing the merging step of 620.

Step 630 determines if the gamma function of the current node changes. If it changes, the Boolean variable EXIT is set as false in step 635. If it doesn't change, the flow goes to step 640 to determine if the current node has more than one successor node. If the current node has more than one successor node, a function create_gamma_function( ) is performed for each successor node in step 645. In the function create_gamma_function( ), a new gamma function in accordance with the definition of PSA form is created based on the propagated gamma function(s) from the predecessor node(s) in step 645. The flow goes to step 650 and the current node is removed from the list of nodes obtained in step 605. If the current node does not have more than one successor node, it goes to step 650 as described earlier. Step 655 determines if the list of nodes is empty. If it is empty, the flow ends and goes to step 660. If it is not empty, the flow goes back to step 610. This ensures that each node in the list is processed.

Figure 5C:
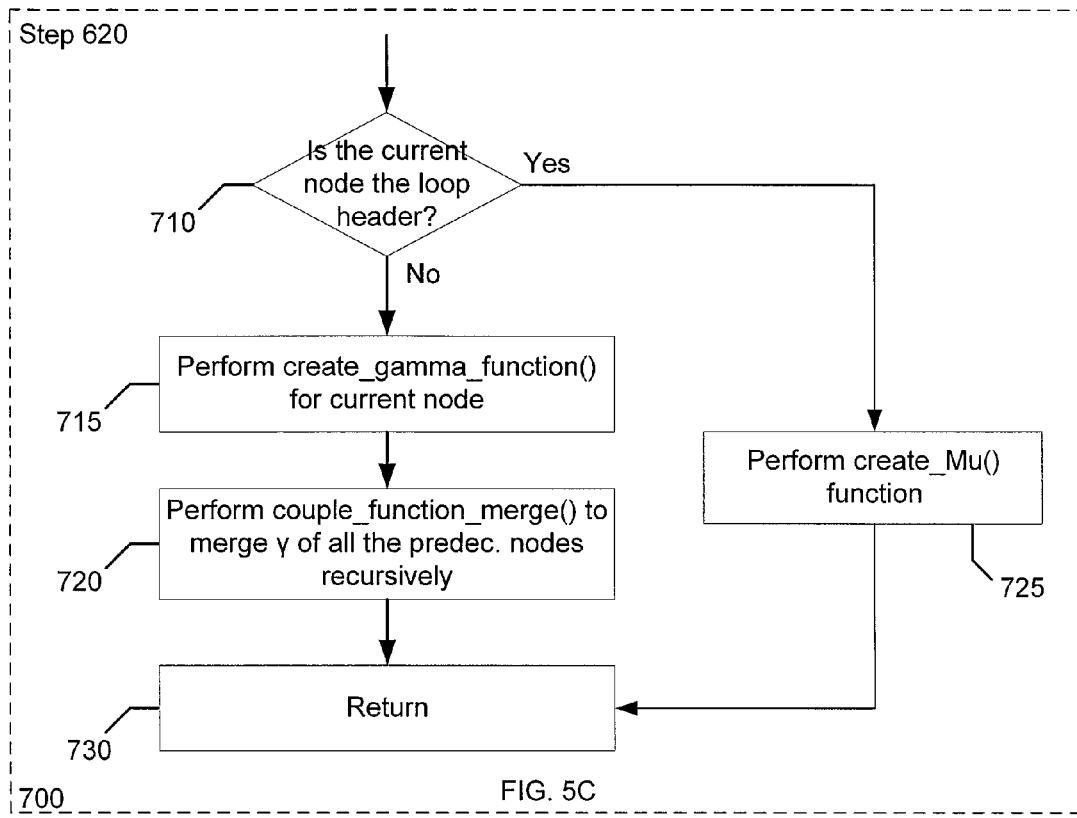
FIG. 5C is a flowchart illustrating the steps of PSA IR form conversion in accordance with one embodiment of the invention.

FIG. 5C illustrates a flowchart 700 of the detailed steps of 620 as described earlier. Step 710 checks if the current node is a loop header. If it is a loop header, step 725 performs create_Mu( ) to insert a new loop definition in accordance with the third property of PSA form as described earlier. Otherwise, step 715 performs the function create_gamma_function( ) to create a new gamma function for the current node in accordance with the first property of PSA form as described earlier. Step 720 performs a function couple_function_merge( ) to merge the gamma functions of all predecessor nodes of the current node recursively. Step 720 repeats until there are no further changes in the merged gamma function. In one embodiment, step 720 first selects and merges two gamma functions to obtain a temporary merged gamma function. It repeatedly selects another previously unselected gamma function and merges it with the temporary merged gamma function until all gamma functions have been merged. Step 720 is further explained in FIG. 5D.

Figure 5D:
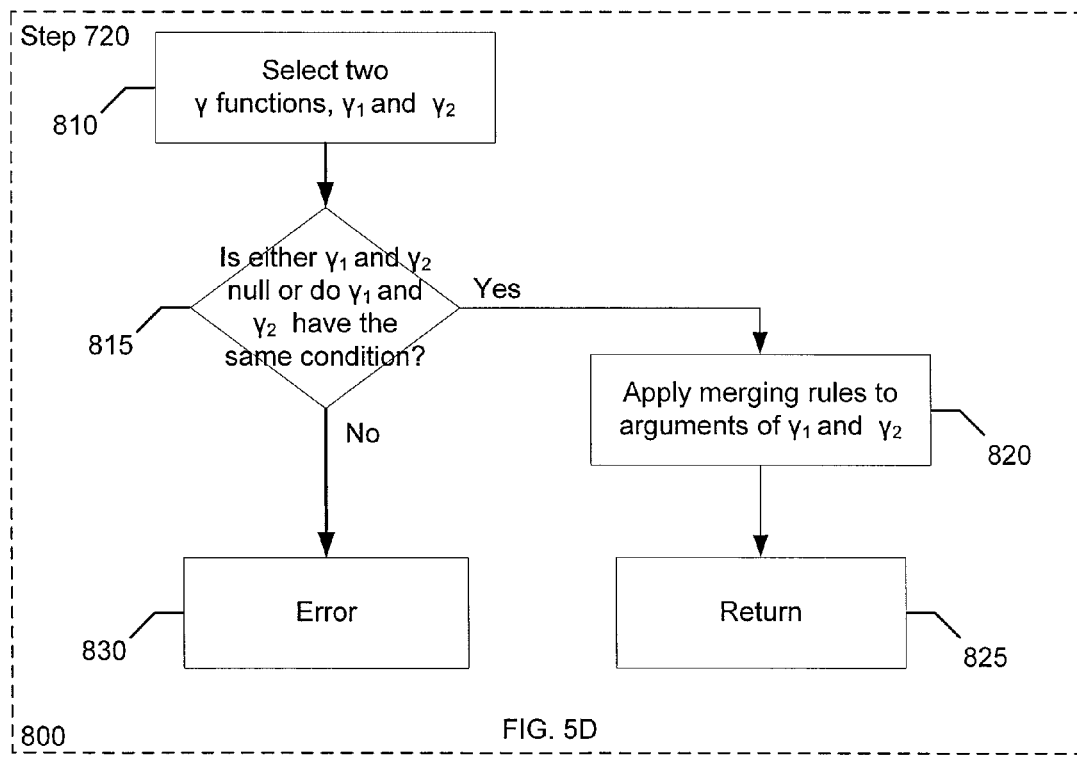
FIG. 5D is a flowchart illustrating the steps of PSA IR form conversion in accordance with one embodiment of the invention.

FIG. 5D illustrates a flowchart 800 of the detailed steps of step 720 as described earlier. Step 810 selects two gamma functions, $\gamma_1$ and $\gamma_2$, from the gamma functions to be merged in step 720. Step 815 determines if either $\gamma_1$ or $\gamma_2$ is null ($\emptyset$) or the condition predicates of $\gamma_1$ and $\gamma_2$ are the same. If yes, merging rules are applied to the arguments of $\gamma_1$ and $\gamma_2$ in step 820. When step 820 is completed, it returns a new merged gamma function in step 825. If the result of step 815 is no, it indicates an unexpected error and step 830 is executed. The merging rules include but are not limited to the following three rules:

Rule One:

$$\gamma(c\gamma_1, \gamma_2) + \gamma(c, \gamma_3, \gamma_4) = \gamma(c, \gamma_1+\gamma_3, \gamma_2+\gamma_4)$$

This rule means that if the condition predicates are the same, the gamma functions on the same outgoing edge of the branch node are merged to form the merged gamma function.

Rule Two:

$$\gamma+\emptyset=\emptyset+\gamma=\gamma$$

This rule means that any gamma function merges with an empty set is always itself.

Rule Three:

$$\gamma(c, \gamma_1, \gamma_1)=\gamma_1$$

This rule applies the simplification in the first property of the PSA form. It means that if the same $\gamma_1$ is propagated to all outgoing edges of the branch node, the corresponding condition predicate c does not provide any useful control flow information.

Although flowchart 800 shows a step to merge two gamma functions, one of ordinary skill in the relevant art will readily appreciate that the merging step can be performed with other combinations without affecting the operation of the invention.

FIG. 6A illustrates example pseudo code 900 implementing the steps set forth in flowcharts 500 and 600. FIG. 6B illustrates example pseudo code 1000 implementing the steps set forth in flowcharts 700 and 800. Detailed explanation of the pseudo codes 900 and 1000 are not undertaken herein as it can be readily understood by one of ordinary skill in the relevant art with reference to the discussion of flowcharts 500, 600, 700 and 800. The function condition ($\gamma$) returns the condition predicate of gamma function y and the function arg($\gamma$, I) returns the argument in the location labeled by I. The function Gamma_f(u) returns the gamma function defined in node u and the function Pro_f(u) returns the gamma function that propagates through current node u. The example pseudo code 900 and 1000 is not meant to be limiting and one of ordinary skill in the relevant art will readily appreciate that other ways of implementing the code to obtain PSA form is possible.

Figures 7, 8:
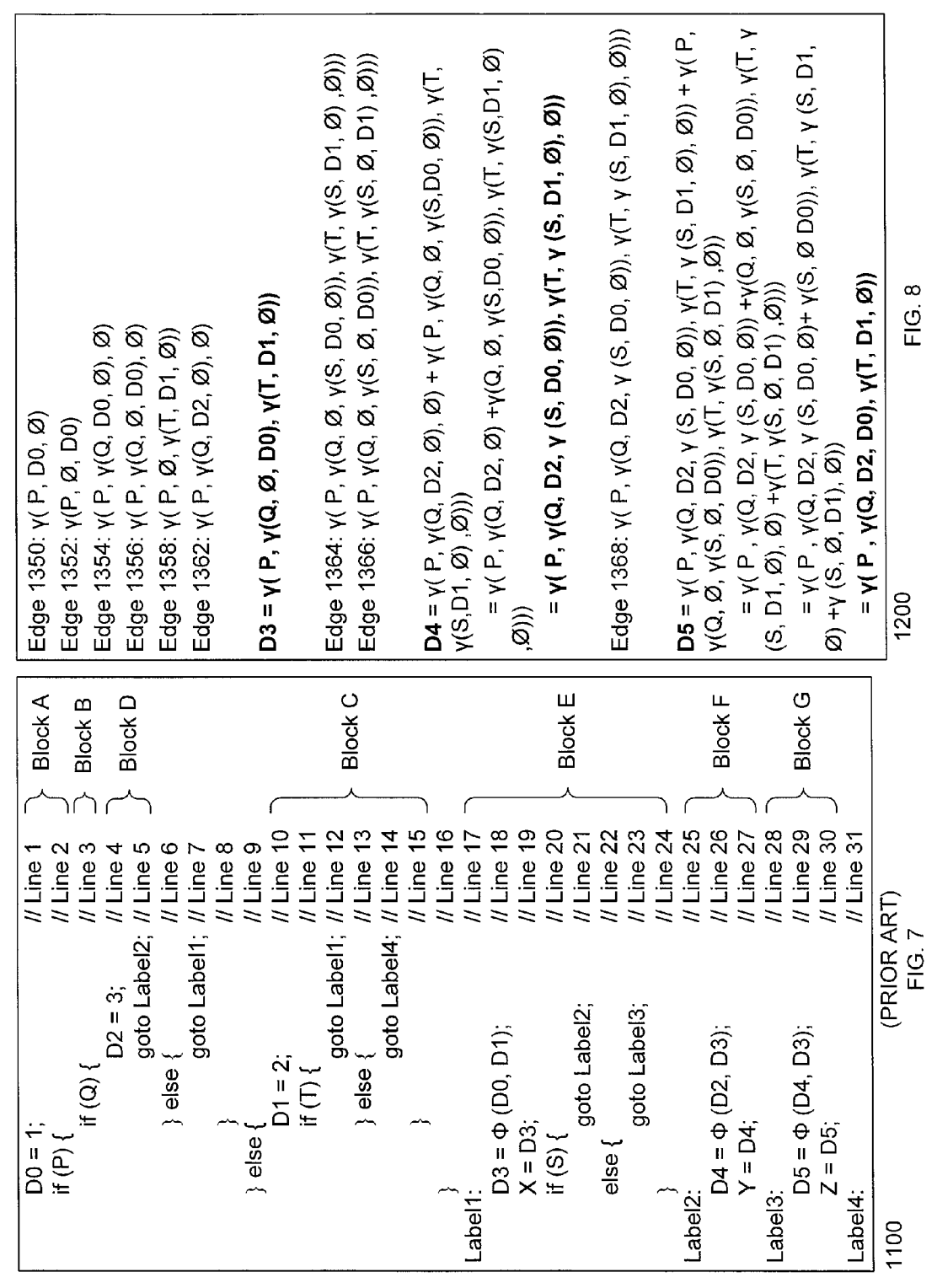
Figure 9:
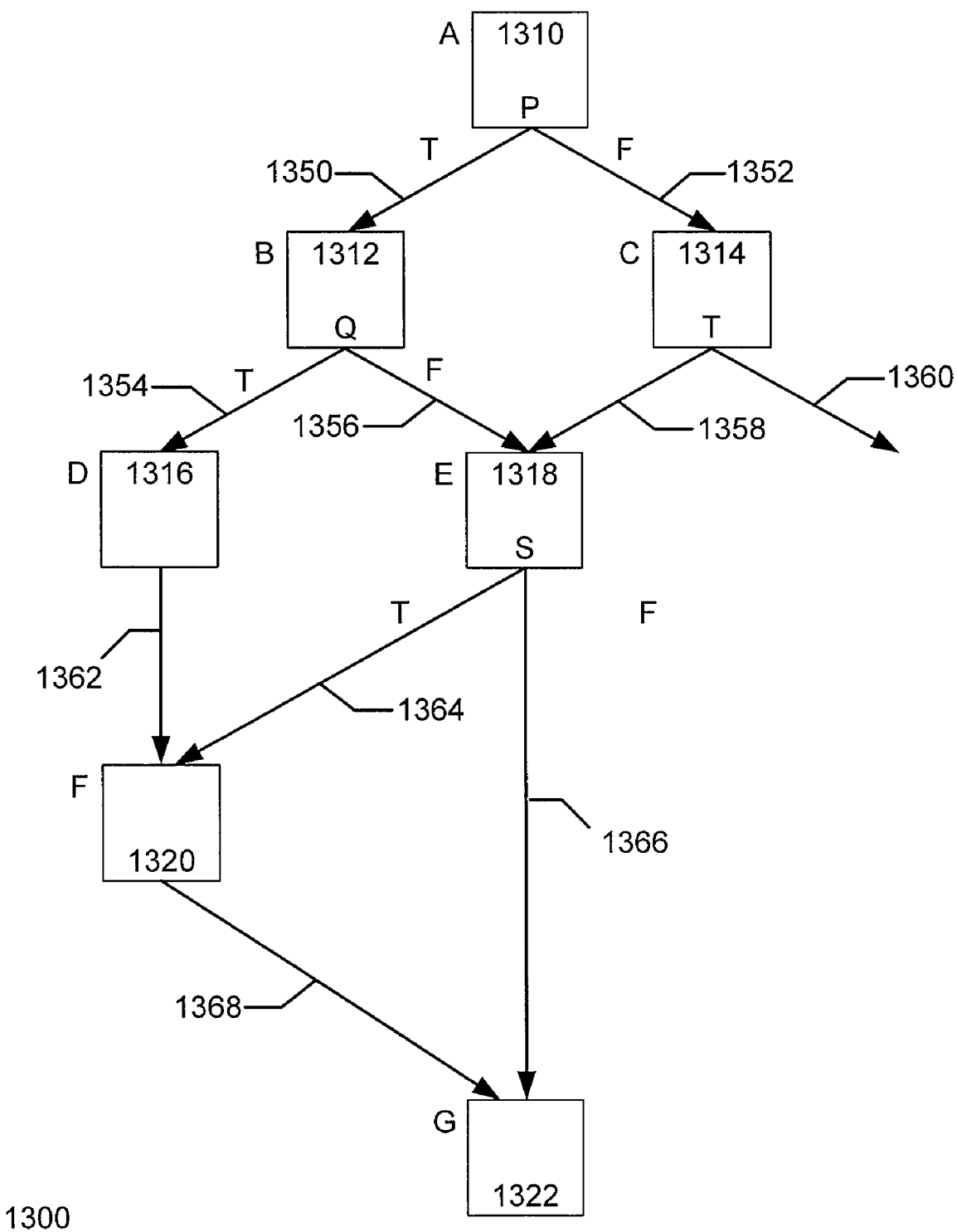
FIG. 9 illustrates a prior art CFG of SSA IR form example.

FIG. 7 illustrates an example of an SSA IR form 1100 of source code without any loop block and FIG. 9 illustrates the corresponding CFG 1300 of the SSA IR form 1100. Basic blocks A, B, C, D, E, F and G in SSA form 1100 are represented as basic blocks 1310, 1312, 1314, 1316, 1318, 1320 and 1322 respectively. The edges 1350, 1352, 1354, 1356, 1358, 1360, 1362, 1364, 1366 and 1368 in CFG 1300 show the flow of the SSA IR form 1100. Detailed explanation of the SSA IR form 1100 and CFG 1300 are not undertaken herein as it can be readily understood by one of ordinary skill in the relevant art.

FIG. 8 illustrates the result 1200 of the steps used to obtain the definition of the versioned variables in PSA form in accordance with one embodiment of the invention. The gamma function of the edges 1350, 1352, 1354, 1356, 1358, 1360, 1362, 1364, 1366 and 1368 are obtained using the first property of the PSA form as described earlier. Definition three, D3 of the SSA form 1100, is in block E as shown in FIG. 7. D3, shown as basic block 1318 in the CFG of FIG. 9, has two predecessor nodes 1312 and 1314 with incoming edges 1356 and 1358 respectively. The gamma functions from predecessor nodes 1312 and 1314 are merged using the steps described earlier. In particular, steps illustrated in flowchart 800 are used to obtain a merged gamma of D3. When step 810 in flowchart 800 is performed, the following gamma functions are obtained:

$$\gamma_1 = \gamma(P, \gamma(Q, \emptyset, D0), \emptyset) \text{ //from Edge 1356}$$

$$\gamma_2 = \gamma(P, \emptyset, \gamma(T, D1, \emptyset)) \text{ //from Edge 1358}$$

Step 815 determines if $\gamma_1$ and $\gamma_2$ have the same condition predicate. Since both $\gamma_1$ and $\gamma_2$ have the same condition predicate P, step 820 is followed. In step 820, merging rules are used to merge $\gamma_1$ and $\gamma_2$. Using rule one of the merging rules described earlier, the following is obtained:

$$D3 = y_1 + y_2$$
$$= y(P, y(Q, \emptyset, D0), \emptyset) + y(P, \emptyset, y(T, D1, \emptyset))$$
$$= y(P, y(Q, \emptyset, D0) + \emptyset, \emptyset + y(T, D1, \emptyset))$$

Using rule two of the merging rules described earlier, the final result of D3 is obtained:

$$D3 = \gamma(P, \gamma(Q, \emptyset, D0), \gamma(T, D1, \emptyset))$$

The method for obtaining D4 and D5 illustrated in FIG. 8 is similar to the method described earlier using the merging rules. Detailed explanation of obtaining D4 and D5 in PSA form is not undertaken herein as it can be readily understood by one of ordinary skill in the relevant art. In D5's gamma function, it contains only the versioned variables D0, D1, D2 from the SSA form 1100 that are not defined by pseudo assignment. The condition predicate S in 1318 from SSA form 1100 does not appear in the D5's gamma function because all its outgoing edges reaches the join node 1318 and it does not decide whether a variable not defined by psuedo assignment arrives the join node 1318. In PSA form, the definition of D5 is simplified while retaining effective and explicit control flow information.

FIG. 10 illustrates an example of an SSA IR form 1400 of source code with a loop block and FIG. 11 illustrates the corresponding CFG 1500 of the SSA IR form 1400. Basic blocks A, B, C, D, and E in SSA IR form 1400 are represented as basic blocks 1510, 1512, 1514, 1516, and 1518 respectively. The edges 1550, 1552, 1554, 1556, 1558, 1560, and 1562 in CFG 1500 show the flow of the SSA IR form 1400. Detailed explanation of the SSA IR form 1400 and CFG 1500 are not undertaken herein as it can be readily understood by one of ordinary skill in the relevant art.

FIG. 12 illustrates the result 1600 of the steps used to obtain the definition of the versioned variables in PSA form in accordance with one embodiment of the invention. The gamma function of the edges 1550, 1552, 1554, 1556, 1558, 1560, and 1562 are obtained using the first property of the PSA form as described earlier. Definition three, D3 of the SSA form 1400, is in block B as shown in FIG. 10. D3, as shown as basic block 1512 in the CFG of FIG. 11, has two predecessor nodes 1510 and 1516 with incoming edges 1550 and 1562 respectively. The gamma functions from predecessor nodes 1550 and 1562 are merged using the steps described earlier.

In the first pass of FIG. 12, all back edges such as edge 1562 are initially assigned as null ∅. Since the node of D3 is a loop header, the μ function of D3 is obtained as follows according to step 725:

$$\gamma_1 = \gamma(P, D0, \emptyset) \text{ //from Edge 1550}$$

$$\gamma_2 = \emptyset \text{ //from Edge 1562}$$

$$D3 = \mu(\gamma(P, D0, \emptyset), \emptyset)$$

The method for obtaining D2 and D4 illustrated in FIG. 12 is similar to the method described earlier using the merging rules. Detailed explanation of obtaining D2 and D4 in PSA form is not undertaken herein as it can be readily understood by one of ordinary skill in the relevant art.

After the first pass, edge 1562 is modified. In the second pass illustrated in FIG. 12, the p function of D3 is obtained as follows according to step 725:

$$\gamma_1 = \gamma(P, D0, \emptyset) \text{ //from Edge 1550}$$

$$\gamma_2 = \gamma(P, \gamma(Q\gamma(R, D1, \emptyset), \gamma(R, D3, \emptyset)), \emptyset) \text{ //from Edge 1562}$$

$$D3 = \mu(\gamma(P, D0, \emptyset), \gamma(P, \gamma(Q, \gamma(R, D1, \emptyset), \gamma(R, D3, \emptyset)), \emptyset))$$

In the third pass illustrated in FIG. 12, D3, D2, D4 do not change any more. According to step 515, 520, 630, the PSA form building is finished.

Figure 14:
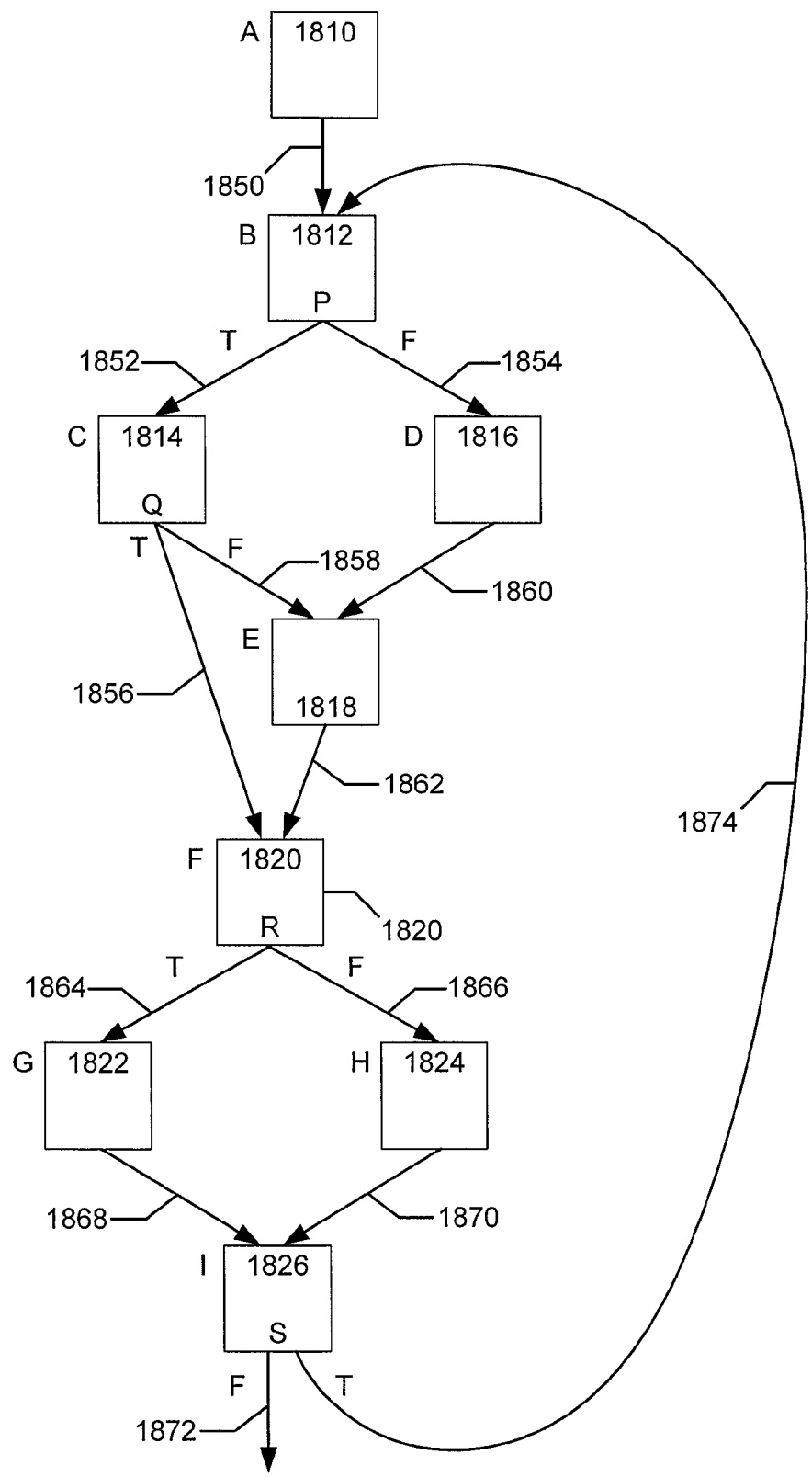
FIG. 14 illustrates a prior art CFG of SSA IR form example.

FIG. 13 illustrates an example of an SSA IR form 1700 of source code and FIG. 14 illustrates the corresponding CFG 1800 of the SSA IR form 1700. Basic blocks A, B, C, D, E, F, G, H and I in SSA IR form 1700 are represented as basic blocks 1810, 1812, 1814, 1816, 1818, 1820, 1822, 1824, and 1826 respectively. The edges 1850, 1852, 1854, 1856, 1858, 1860, 1862, 1864, 1866, 1868, 1870, 1872 and 1874 in CFG 1800 show the flow of the SSA IR form 1700. Detailed explanation of the SSA IR form 1700 and CFG 1800 are not undertaken herein as it can be readily understood by one of ordinary skill in the relevant art.

As illustrated in FIG. 13, the PSA form of definition D5 can be obtained using the steps described earlier and the expression of D5 is obtained as $$D5 = \gamma(P, \gamma(R, D0, D4), \gamma(R, D1, D4))$$

The probability of reaching D0 to D5 as illustrated in FIG. 14 is easily calculated by multiplying the execution probabilities of the left edge 1852 of condition predicate P and the left edge 1864 of condition predicate R. Compared to other forms like SSA, GSA and TGSA, the path information from D0 to D5 cannot be determined for this example. PSA form gives simple but effective and explicit control and data flow information.

Figure 15:
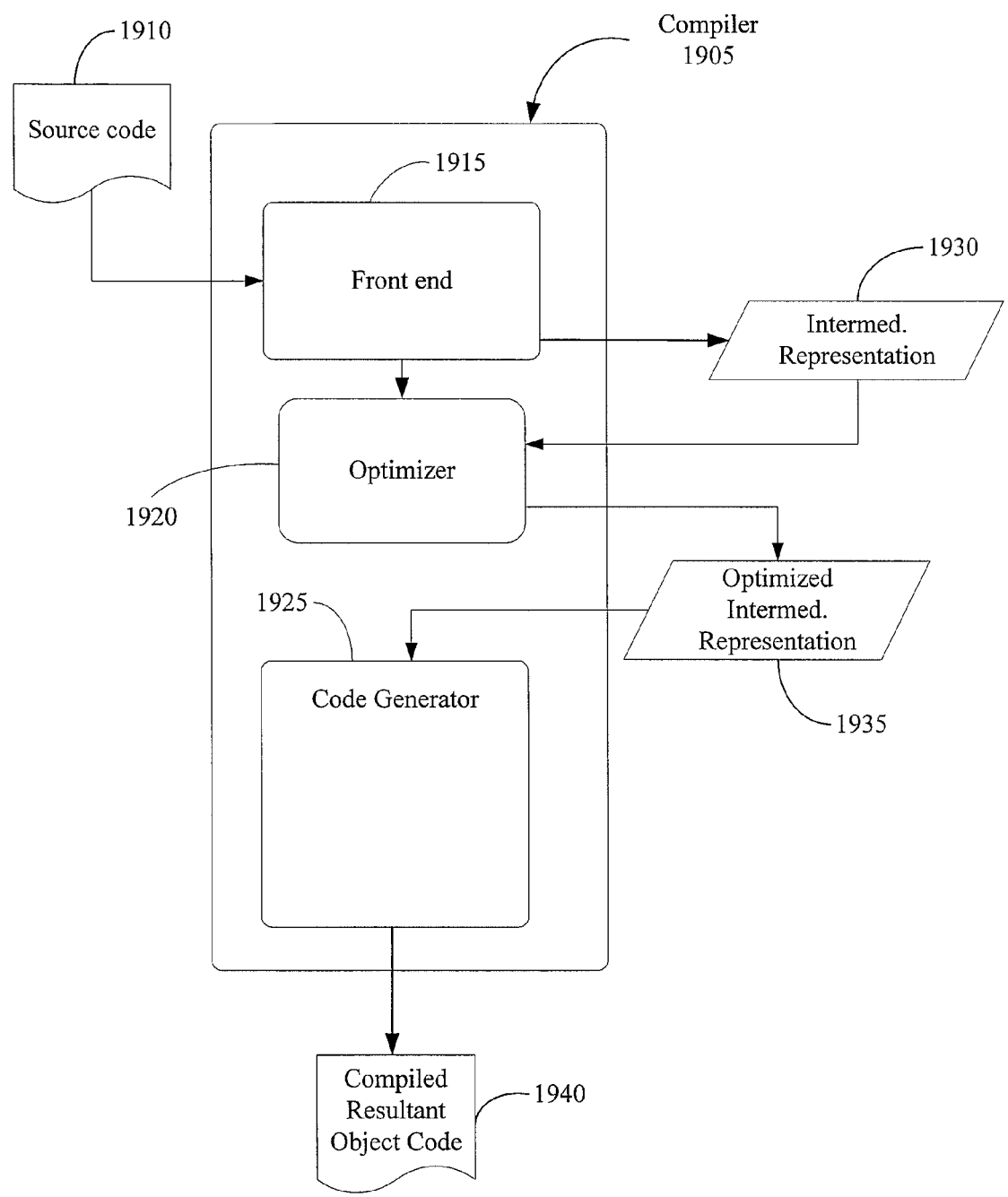
FIG. 15 illustrates a compiler in accordance with one embodiment of the invention.

FIG. 15 illustrates one embodiment of a compiler 1905. Compiler 1905 has a front end 1915 to receive source code 1910, an optimizer 1920 to optimize IR code and a code generator 1925 to generate the compiled resultant object code 1940. The front end 1915 sends the received source code 1910 to the IR block 1930 and the IR block 1930 converts the source code 1910 into PSA form by performing the steps as discussed earlier. The IR block 1930 sends the PSA code to the optimizer for optimization to produce an optimized PSA form 1935. The optimized PSA IR form 1935 block is received by the code generator 1925 and the compiled resultant object code 1940 is generated. In another embodiment, the compiler 1905 does have the optimizer 1920 and the code generator 1925 compiles the PSA form IR directly.

Figure 16:
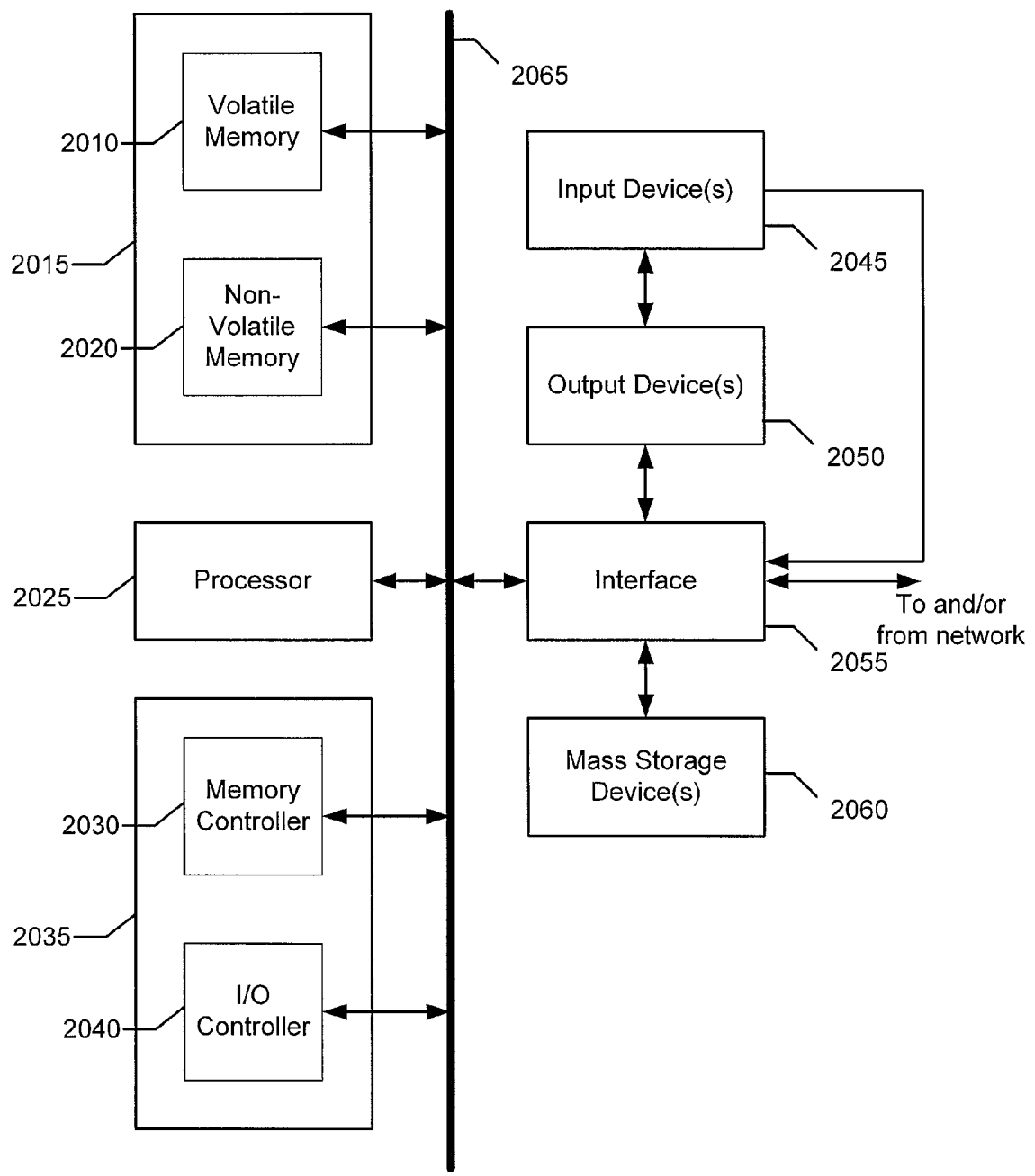
FIG. 16 illustrates a block diagram of a system in according to an embodiment of the invention.

FIG. 16 is a block diagram of a system 2000 to implement the methods disclosed herein according to an embodiment. The system 2000 includes but is not limited to, a desktop computer, a laptop computer, a notebook computer, a personal digital assistant (PDA), a server, a workstation, a cellular telephone, a mobile computing device, an Internet appliance or any other type of computing device. In another embodiment, the system 2000 used to implement the methods disclosed herein may be a system on a chip (SOC) system.

The system 2000 includes a chipset 2035 with a memory controller 2030 and an input/output (I/O) controller 2040. A chipset typically provides memory and I/O management functions, as well as a plurality of general purpose and/or special purpose registers, timers, etc. that are accessible or used by a processor 2025. The processor 2025 may be implemented using one or more processors.

The memory controller 2030 performs functions that enable the processor 2025 to access and communicate with a main memory 2015 that includes a volatile memory 2010 and a non-volatile memory 2020 via a bus 2065.

The volatile memory 2010 includes but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2020 includes but is not limited by, flash memory, Read Only Memory (ROM), Electrically Erasable Programmable Read Only Memory (EEPROM), and/or any other desired type of memory device.

Memory 2015 stores information and instructions to be executed by the processor 2025. Memory 2015 may also stores temporary variables or other intermediate information while the processor 2025 is executing instructions.

The system 2000 includes but is not limited to, an interface circuit 2055 that is coupled with bus 2065. The interface circuit 2055 is implemented using any type of well known interface standard including, but is not limited to, an Ethernet interface, a universal serial bus (USB), a third generation input/output interface (3GIO) interface, and/or any other suitable type of interface.

One or more input devices 2045 are connected to the interface circuit 2055. The input device(s) 2045 permit a user to enter data and commands into the processor 2025. For example, the input device(s) 2045 is implemented using but is not limited to, a keyboard, a mouse, a touch-sensitive display, a track pad, a track ball, and/or a voice recognition system.

One or more output devices 2045 connect to the interface circuit 2055. For example, the output device(s) 2050 are implemented using but are not limited to, light emitting displays (LEDs), liquid crystal displays (LCDs), cathode ray tube (CRT) displays, printers and/or speakers). The interface circuit 2055 includes a graphics driver card.

The system 2000 also includes one or more mass storage devices 2060 to store software and data. Examples of such mass storage device(s) 2060 include but are not limited to, floppy disks and drives, hard disk drives, compact disks and drives, and digital versatile disks (DVD) and drives.

The interface circuit 2055 includes a communication device such as a modem or a network interface card to facilitate exchange of data with external computers via a network. The communication link between the system 2000 and the network may be any type of network connection such as an Ethernet connection, a digital subscriber line (DSL), a telephone line, a cellular telephone system, a coaxial cable, etc.

Access to the input device(s) 2045, the output device(s) 2050, the mass storage device(s) 2060 and/or the network is typically controlled by the I/O controller 2040 in a conventional manner. In particular, the I/O controller 2040 performs functions that enable the processor 2025 to communicate with the input device(s) 2045, the output device(s) 2050, the mass storage device(s) 2060 and/or the network via the bus 2065 and the interface circuit 2055.

While the components shown in FIG. 16 are depicted as separate blocks within the system 2000, the functions performed by some of these blocks may be integrated within a single semiconductor circuit or may be implemented using two or more separate integrated circuits. For example, although the memory controller 2030 and the I/O controller 2040 are depicted as separate blocks within the chipset 2035, one of ordinary skill in the relevant art will readily appreciate that the memory controller 2030 and the I/O controller 2040 may be integrated within a single semiconductor circuit.

Although examples of the embodiments of the disclosed subject matter are described, one of ordinary skill in the relevant art will readily appreciate that many other methods of implementing the disclosed subject matter may alternatively be used. For example, the order of execution of the blocks in the flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method to provide effective control and data flow information in an Intermediate Representation (IR) form comprising:
    converting received source code into the IR form, wherein the IR form is a Static Single Assignment (SSA) IR form in which a versioned variable originally defined by a phi function is defined by a gamma function of the versioned variable from an entry node of a Control Flow Graph (CFG) of the IR form or by a mu function of the versioned variable, and the gamma function of the versioned variable keeps control path information for the versioned variable;

generating, by a computing device, a list of nodes of a the CFG in topological order;

selecting, by the computing device, a first node in the list of nodes as a current node;

determining, by the computing device, that the current node has a plurality of predecessor nodes;

merging, by the computing device in accordance with a set of merging rules, a gamma function of each of the plurality of predecessor nodes to obtain a merged gamma function responsive to the determination, wherein the gamma functions of the plurality of predecessor nodes keep control path information for versioned variables at the plurality of predecessor nodes and the merged gamma function omits one or more pieces of control path information kept by the gamma functions of the plurality of predecessor nodes that are defined as redundant or unnecessary by the merging rules; and propagating, by the computing device, the merged gamma function to all successor nodes of the current node.

2. The method of claim 1 further comprising:

determining, by the computing device, that the current node has a plurality of successor nodes; and creating, by the computing device, the gamma function of each of the plurality of successor nodes responsive to the determination that the current node has a plurality of successor nodes.

3. The method of claim 2 further comprising:

removing, by the computing device, the current node from the list of nodes; and repeating, by the computing device, the selecting, determining that the current node has a plurality of predecessor nodes, merging, propagating, determining that the current node has a plurality of successor nodes, and creating until the list of nodes is empty.

4. The method of claim 1 wherein the merging comprises:

creating the gamma function of all predecessor nodes of the current node.

5. The method of claim 1 wherein the merging comprises:

selecting a first predecessor node and a second predecessor node from the plurality of predecessor nodes;

merging the gamma function of the first and the second predecessor node to obtain a temporary gamma function;

selecting a previously unselected predecessor node as a third predecessor node from the plurality of predecessor nodes;

replacing the temporary gamma function by merging the temporary gamma function with a gamma function of the third predecessor node;

repeating the method of selecting the third predecessor node and replacing until all unselected predecessor nodes from the plurality of predecessor nodes have been selected; and setting the temporary gamma function as the merged gamma function when the repetition is complete.

6. The method of claim 5, wherein merging the gamma function of the first and the second predecessor node comprises:

determining that conditions of the gamma function of the first and the second predecessor node are the same; and applying the set of merging rules to merge arguments of the gamma function of the first and the second predecessor node responsive to the determination that conditions of the gamma function of the first and the second predecessor node are the same.

7. The method of claim 5, wherein merging the gamma function of the first and the second predecessor node comprises:

determining that conditions of the gamma function of the first and the second predecessor node are the same and that the current node is a loop header of the source code; and generating a loop definition responsive to the determination that conditions of the gamma function of the first and the second predecessor node are the same and that the current node is the loop header of the source code.

8. A non-transitory computer-readable medium having instructions stored thereon which are configured to cause one or more processors of a computing device, in response to execution of the instructions by the one or more processors, to:

convert received source code into an Intermediate Representation (IR) form, wherein the IR form is a Static Single Assignment (SSA) IR form in which a versioned variable originally defined by a phi function is defined by a gamma function of the versioned variable from an entry node of a Control Flow Graph (CFG) of the IR form or by a mu function of the versioned variable, and the gamma function of the versioned variable keeps control path information for the versioned variable;

generate a list of nodes of a Control Flow Graph (CFG) in topological order;

select a first node in the list of nodes as a current node;

determine that the current node has a plurality of predecessor nodes;

merge, in accordance with a set of merger rules, a gamma function of each of the plurality of predecessor nodes to obtain a merged gamma function responsive to the determination, wherein the gamma functions of the plurality of predecessor nodes keep control path information for versioned variables at the plurality of predecessor nodes and the merged gamma function omits one or more pieces of control path information kept by the gamma functions of the plurality of predecessor nodes that are defined as redundant or unnecessary by the merger rules; and propagate the merged gamma function to all successor nodes of the current node.

9. The non-transitory computer-readable medium of claim 8, wherein the instructions are further configured, in response to execution, to cause the one or more processors to:

determine that the current node has a plurality of successor nodes; and create the gamma function of each of the plurality of successor nodes responsive to the determination that the current node has a plurality of successor nodes.

10. The non-transitory computer-readable medium of claim 8, wherein the instructions are further configured, in response to execution, to cause the one or more processors to:

remove the current node from the list of nodes; and repeat selection, determination that the current node has a plurality of predecessor nodes, merger, propagation, determination that the current node has a plurality of successor nodes and creation until the list of nodes is empty.

11. The non-transitory computer-readable medium of claim 8 wherein the instructions are further configured, in response to execution to cause the one or more processors to merge through:

creation of the gamma function of all predecessor nodes of the current node.

12. The non-transitory computer-readable medium of claim 8 wherein the instructions are further configured, in response to execution, to cause the one or more processors to merge through:
- selection of a first predecessor node and a second predecessor node from the plurality of predecessor nodes;
- merger of the gamma function of the first and the second predecessor node to obtain a temporary gamma function;
- selection of a previously unselected predecessor node as a third predecessor node from the plurality of predecessor nodes;
- replacement of the temporary gamma function through merger of the temporary gamma function with a gamma function of the third predecessor node;
- repetition of the method of selecting the third predecessor node and replacement until all unselected predecessor nodes from the plurality of predecessor nodes have been selected; and
- set of the temporary gamma function as the merged gamma function when the repetition is complete.

13. The non-transitory computer-readable medium of claim 12, wherein instructions are further configured, in response to execution, to cause the one or more processors to merge the gamma function of the first and the second predecessor node through:
- determination that conditions of the gamma function of the first and the second predecessor node are the same; and
- application of the set of merger rules to merge arguments of the gamma function of the first and the second predecessor node responsive to the determination that conditions of the gamma function of the first and the second predecessor node are the same.

14. The non-transitory computer-readable medium of claim 12, wherein instructions are further configured, in response to execution, to cause the one or more processors to merge the gamma function of the first and the second predecessor node through:
- determination that conditions of the gamma function of the first and the second predecessor node are the same and that the current node is a loop header of the source code; and
- generation of a loop definition responsive to the determination that conditions of the gamma function of the first and the second predecessor node are the same and that the current node is the loop header of the source code.

15. An apparatus for operating a compiler, the apparatus comprising: one or more computer processors;
- a front end configured to be operated by the one or more processors to receive source code;
- a Intermediate Representation (IR) block, coupled with the front end and configured to be operated by the one or more computer processors to:
  - convert the source code into an IR form, wherein the IR form is a Static Single Assignment (SSA) IR form in which a versioned variable originally defined by a phi function is defined by a gamma function of the versioned variable from an entry node of a Control Flow Graph (CFG) of the IR form or by a mu function of the versioned variable, and the gamma function of the versioned variable keeps control path information for the versioned variable;
  - generate a list of nodes of the CFG in topological order;
  - select a first node in the list of nodes as a current node;
  - determine that the current node has a plurality of predecessor nodes;
  - merge, in accordance with a set of merger rules, the gamma function of each of the plurality of predecessor nodes to obtain a merged gamma function responsive to the determination, wherein the merged gamma function omits one or more pieces of control path information kept by the gamma functions of the plurality of predecessor nodes that are defined as redundant or unnecessary by the merger rules; and
  - propagate the merged gamma function to all successor nodes of the current node; and
- a code generator, coupled to the IR block, and configured to be operated by the one or more computer processors to compile the IR form into an object code.

16. The apparatus of claim 15, wherein the IR block is further configured to be operated by the one or more computer processors to associate the gamma function of the versioned variable from the node in the CFG with a condition predicate of a branch statement in the node and with gamma functions of the versioned variable from immediate successor nodes of the node when the node is a branch node.

17. The apparatus of claim 15, wherein the gamma function of the versioned variable from a node in the CFG is the gamma function of an other versioned variable from an other node in the CFG, wherein the other node is the first branch node along all paths in the CFG from the node to the other node when the node is not a branch node and there is at least one path from the node to the other node comprising at least one branch node.

18. The apparatus of claim 15, wherein the IR block is further configured to be operated by the one or more computer processors to replace the gamma function of a first versioned variable from a node in the CFG by a second versioned variable that is not defined by any gamma function and that reaches a definition node of the first versioned variable along a direct path in the CFG from the node to the definition node when the node is not a branch node and there exists only one direct path.

19. The apparatus of claim 15, wherein the IR block is further configured to be operated by the one or more computer processors to replace the gamma function of the versioned variable from the node in the CFG by null when there is no path in the CFG from the node to a definition node of the versioned variable.

20. The apparatus of claim 15, wherein the IR block is further configured to be operated by the one or more computer processors to replace each phi function that defines the versioned variable in the IR form with the gamma, function of the versioned variable from the entry node of the CEO when the phi function is not in a loop header.

21. The apparatus of claim 15, wherein the IR block is further configured to be operated by the one or more computer processors to replace each phi function that defines the versioned variable in the IR form with the mu function of the versioned variable when the phi function is in a loop header.

22. The apparatus of claim 21, wherein the IR block is further configured to be operated by the one or more computer processors to associate the mu function of the versioned variable of the variable with the gamma function of an initial versioned variable of the variable entering a loop header from outside a loop body and with the gamma function of the versioned variable of the variable reaching the loop header from the back edges of the loop body, wherein the gamma functions are the gamma functions of corresponding versioned variables from the entry node of the CFG.

23. The apparatus of claim 15, wherein the IR block is further configured to be operated by the one or more processors to:

determine that the current node has a plurality of successor nodes; and create the gamma function of each of the plurality of successor nodes responsive to the determination that the current node has a plurality of successor nodes.

24. The apparatus of claim 23, wherein the IR block is further configured to be operated by the one or more computer processors to:

remove the current node from the list of nodes; and repeat selection, determination that the current node has a plurality of predecessor nodes, merger, propagation, determination that the current node has a plurality of successor nodes and creation until the list of nodes is empty.

25. The apparatus of claim 15, wherein the merge comprises:

creation of the gamma function of all predecessor nodes of the current node.

26. The apparatus of claim 15, wherein the merge comprises:

selection of a first predecessor node and a second predecessor node from the plurality of predecessor nodes;

merger of the gamma function of the first and the second predecessor node to obtain a temporary gamma function;

selection of a previously unselected predecessor node as a third predecessor node from the plurality of predecessor nodes;

replacement of the temporary gamma function by merger of the temporary gamma function with a gamma function of the third predecessor node;

repetition of selection of the third predecessor node and replacement until all unselected predecessor nodes from the plurality of predecessor nodes have been selected; and set of the temporary gamma function as the merged gamma function when the repetition is complete.

27. The apparatus of claim 26, wherein merger of the gamma function of the first and the second predecessor node comprises:

determination that conditions of the gamma function of the first and the second predecessor node are the same; and application of the set of merger rules to merge arguments of the gamma function of the first and the second predecessor node responsive to the determination that conditions of the gamma function of the first and the second predecessor node are the same.

28. The apparatus of claim 26, wherein merger of the gamma function of the first and the second predecessor node comprises:

determination that conditions of the gamma function of the first and the second predecessor node are the same and that the current node is a loop header of the source code; and generation of a loop definition responsive to the determination that conditions of the gamma function of the first and the second predecessor node are the same and that the current node is the loop header of the source code.

* * * * *